United States Patent [19]
Kiene et al.

[11] Patent Number: 5,325,724
[45] Date of Patent: Jul. 5, 1994

[54] APPARATUS FOR MEASURING THE FLOWRATE OF A FLUID

[76] Inventors: Wilfried Kiene, Am Fuchsber 33, D-3510 Münden; Peter Nissen, Birkenweg 1, 3405 Rosdorf, both of Fed. Rep. of Germany

[21] Appl. No.: 979,833

[22] Filed: Nov. 23, 1992

[30] Foreign Application Priority Data

Nov. 22, 1991 [EP] European Pat. Off. ......... 91119972.7

[51] Int. Cl.⁵ .............................................. G01F 1/60
[52] U.S. Cl. ................................ 73/861.16; 73/861.12
[58] Field of Search ............ 73/861.12, 861.15, 861.16

[56] References Cited

U.S. PATENT DOCUMENTS 4,663,976  5/1987  Suzuki et al. ................... 73/861.12

FOREIGN PATENT DOCUMENTS

| 0418033 | 3/1991 | European Pat. Off. ......... 73/861.12 |
| 0451308 | 10/1991 | European Pat. Off. . |
| 2240054 | 2/1974 | Fed. Rep. of Germany . |
| 2743954 | 4/1979 | Fed. Rep. of Germany . |
| 58-047214 | 3/1983 | Japan . |
| 2183943 | 6/1987 | United Kingdom . |

Primary Examiner—Herbert Goldstein
Assistant Examiner—Elizabeth L. Dougherty
Attorney, Agent, or Firm—Ratner & Prestia

[57] ABSTRACT

A device to measure the flowrate of a fluid containing electrical charges which flows in a pipe section. The device includes at least one electromagnet connected to a current source which generates a magnetic field through the pipe section and at least two electrodes whose central imaginary connecting line passes through the flow stream in the region of the magnetic field to measure the potential resulting from the charge displacements. The circuitry also includes a timing circuit which periodically changes the strength of the excitation current from the current source to the electromagnet and switches a signal shunt which is connected between the electrodes and at least two signal memories. The timing circuit also controls a current sink which is connected in parallel with the electromagnet. The two signal memories, which store signals from the electrodes, are connected to a correction circuit to which the signals stored in the memories are supplied to produce an output signal corresponding to the flowrate of the fluid in the pipe section which is only minimally dependent of the flow profile or the level of the fluid in the pipe section.

14 Claims, 2 Drawing Sheets

APPARATUS FOR MEASURING THE FLOWRATE OF A FLUID

BACKGROUND OF THE INVENTION

The present invention relates to a circuit for a device to measure the flowrate of a fluid containing electrical charges which flows in a pipe section. Such a device includes (1) at least one electromagnet connected to a current source which generates a magnetic field through the pipe section, (2) at least two electrodes whose central imaginary connecting line passes through the flow stream in the region of the magnetic field to measure the potential resulting from the charge displacements in the flowing fluid, and (3) a timing circuit which periodically changes the strength of the excitation current from the current source to the electromagnet and switches a signal shunt which is connected between the electrodes and at least two signal memories which are connected to a correction circuit, which, from the signals stored in the memories, produces an output signal corresponding to the flowrate of the fluid in the pipe section which is only minimally dependent on the flow profile or the level of the fluid in the pipe section.

The known electromagnet described in DE-OS 27 43 954 can be deenergized or have its polarity reversed to change the magnetic field in the pipe section and thereby develop a correction function from the signals coming from the electrodes, with which it is possible to produce an output signal corresponding to the flowrate of the fluid in the pipe section which is essentially independent of the flow profile.

A similar circuit arrangement for a pipe section is known from EP-0451 308 A1, which contains two pairs of electrodes with which the level of the fluid in the pipe section can be determined and through a correction function develop an output signal which is essentially independent of the flow profile in the flow stream and/or the level of the fluid in the pipe section.

SUMMARY OF THE INVENTION

An object of the present invention is to provide a circuit arrangement for a device to measure the flowrate of a fluid containing electrical charges which flows in a pipe section which is relatively simple and permits the use of a higher order parameter correction function.

This object is achieved by a circuit arrangement which is characterized by a timing circuit controlled current sink connected in parallel with the electromagnet.

The connection of a current sink in a circuit is technically simple to accomplish. Furthermore, a current sink can be very easily structured to provide different correction functions, so that it is preferred to control the current sink from the correction circuit. To produce an alternating current in the electromagnet, the current source can, in the simplest case, be an alternating current source. A direct current source can also be used and a reverse/off switch, controlled by the timing circuit, can be connected between the direct current source and the electromagnet to prevent any undesirable polarization potentials from being generated at the electrodes.

The invention will be described by the following example with reference to the drawings.

DETAILED DESCRIPTION OF THE INVENTION

Figure 1:
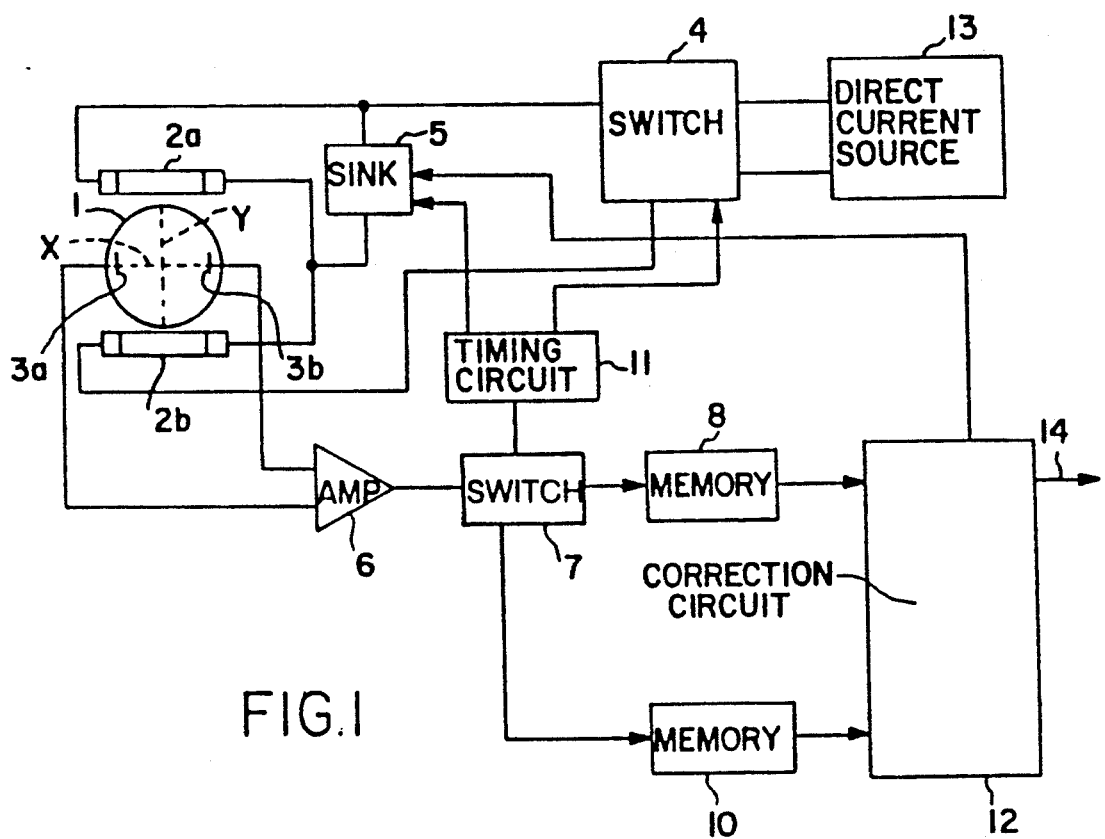
FIG. 1 is a diagram, primarily in block form, of the circuit arrangement of the present invention.

FIG. 1 shows a pipe section 1 that has, on its inner surface, an electrically insulating material and two electromagnets 2a, 2b, outside the pipe section 1, to generate a magnetic field in the pipe section 1 essentially diametrical along a central axis Y. Two electrodes 3a, 3b, influenced by the charge difference in the fluid, are arranged so that an imaginary line X connecting their centers passes diametrically through the flow stream and is perpendicular to the central axis Y of the electromagnets 2a, 2b.

Figure 1A:
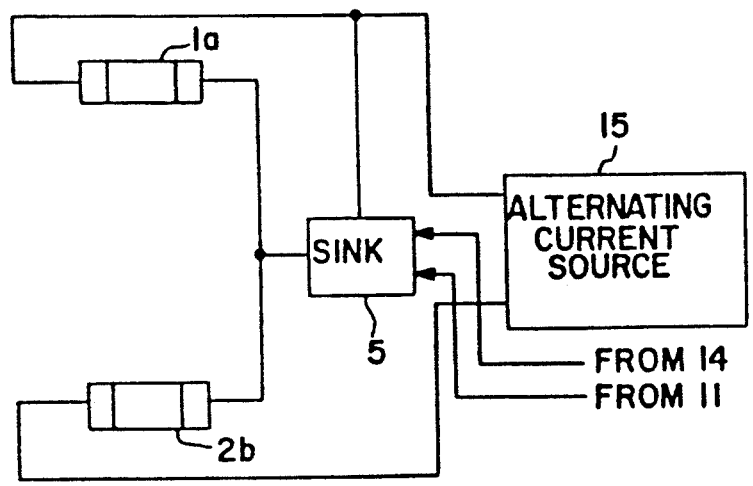
FIG. 1A is a block diagram of a modification to a portion of the circuit arrangement of FIG. 1.

The electromagnets 2a, 2b are connected in series to a direct current source 13 through the reverse/off switch 4. A current sink is connected in parallel to the electromagnet 2a. As shown in FIG. 1A, the current source can, in the simplest case, be an alternating current source 15.

The signals from an amplifier 6, connected to the electrodes 3a, 3b, are fed to a signal switching element 7 which sends these signals to a first memory 8 or a second memory 10 dependent upon the output pulse of the timing circuit 11. The signals stored in the memories 8, 10 are fed to a correction circuit 12 which produces an output signal at output 14.

The timing circuit 11 and the correction circuit 12 control the current sink. Additionally, the reverse/off switch 4 is controlled by the timing circuit 11.

Assuming a constant fluid flow through a full pipe section 1, when only one of the electromagnets is energized, the output from the electrodes is one-half the output from the electrodes when both electromagnets are energized. Reversing the current in one of the electromagnets, reduces the output from electrodes and when the opposing currents are equal, the output from the electrodes is zero.

For a half-full pipe section 1, the lower half of the pipe section has conductive fluid, while the upper half of the pipe section has nonconductive air. Despite the fact that the volume of fluid flow is half of that for a full pipe section, the output from the electrodes of a conventional magnetic flowmeter, when both electromagnets are energized, is the same as for a full pipe section, so that the flowrate reading is off by 100%.

Because magnetic field strength is greater at a point close to an electromagnet than at a remote point, for a partially full pipe section, the lower electromagnet contributes more to the outputs from the electrodes than does the upper electromagnet. This asymmetrical arrangement for a partially full pipe section results in an imbalance of the partial electrode signals. This problem can be overcome by varying the excitation current supplied to one of the electromagnets, so as to differentiate the normal outputs from the electrodes obtained in the usual electromagnet excitation mode from the outputs from the electrodes when the excitation current in one of the electromagnets has been reduced to detect a partially filled pipe section or distorted flow profiles.

Figure 2:
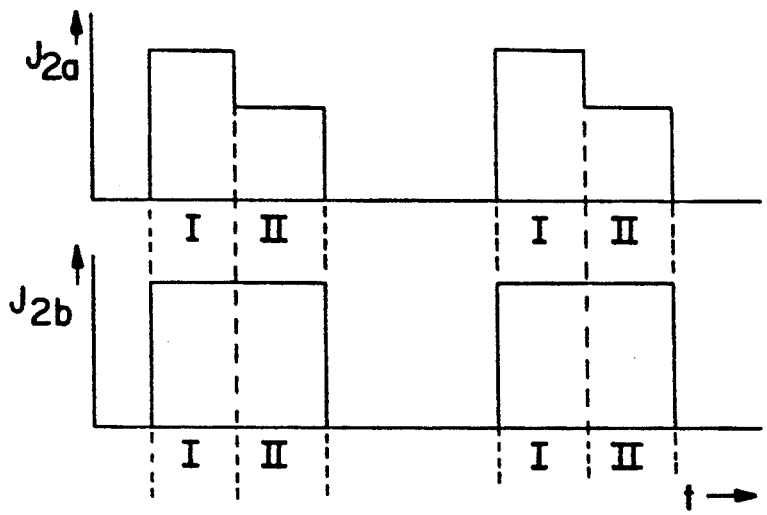
FIG. 2 shows the current/time relationship through both electromagnets for the circuit arrangement of FIG. 1 when the electromagnets have aiding polarities and the current sink is controlled.
Figure 3:
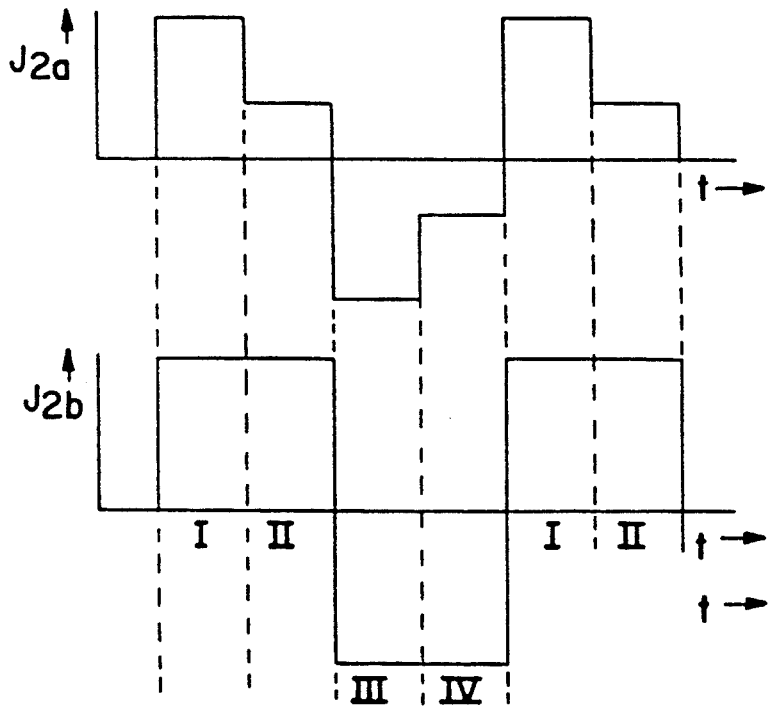
FIG. 3 shows the current/time relationship through the electromagnets when the electromagnets are excited alternately with opposite polarities with both electromagnets having the same polarity.

Referring to FIGS. 2 and 3, the current $J_{2a}$ in electromagnet 2a is reduced at a specific time by use of the current sink 5. This is indicated by the time periods designated I and II in FIGS. 2 and 3. The amount of the reduction is a function of the signal received by the current sink 5 from the correction circuit 12. The signals from amplifier 6 are fed to memory 8 during time period I and to memory 10 during time period II. During a calibration procedure on a flow test rig, the sizes of the signals stored in memories 8 and 10 under differing fill-states of the pipe section can be determined empirically. The case shown in FIG. 2 is for an undisturbed flow profile and a full pipe condition in the pipe section 1 and the case shown in FIG. 3 is for a disturbed flow profile and/or a partially full pipe condition in the pipe section 1.

FIG. 2 shows the current $J_{2a}$ and $J_{2b}$ time t relationship for both electromagnets for synchronized aiding excitation. In the time period I, the current sink 5 is not active. The current sink 5 is active in the time period II.

FIG. 3 shows the current $J_{2a}$ and $J_{2b}$ time t relationship for both electromagnets for synchronized alternating pulse excitation. In the time periods I and III, the current sink 5 is not in use. The current sink 5 is active in the time periods II and IV.

Figure 4:
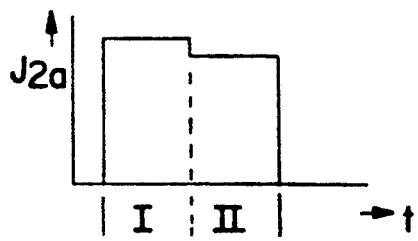
FIGS. 4 and 5 show two different current/time relationships through the electromagnets with the current sink connected in parallel, for two different flow profiles or levels in the pipe section.

FIG. 4 shows the current $J_{2a}$ time t relationship for the electromagnet 2a for an undisturbed flow profile and full pipe condition in the pipe section 1 in the time periods I and II.

Figure 5:
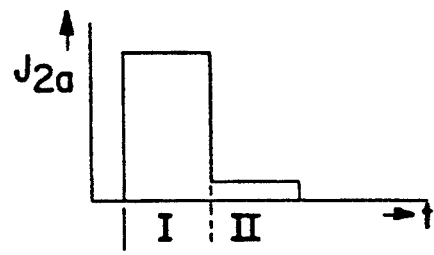

FIG. 5 shows the current $J_{2a}$ time t relationship for a disturbed flow profile and/or partially full pipe condition in the pipe section 1.

The nature of the magnetic field in the pipe section 1 is changed within the time periods I and II in order to provide different signals to the correction circuit 12 to develop the correction function. The reduction in excitation current can be fixed or variable in response to correction circuit 12 which, in essence, can be arranged as a "look-up table" from which a control of sink 5 is provided. For a relatively full pipe section, sink 5 reduces the excitation current to electromagnet 2a only slightly, while, for partially full pipe sections, sink 5 reduces the excitation current to electromagnet 2a to a greater extent dependent upon the degree of filling of the pipe section.

If, for example, a signal from an undisturbed flow profile exists, then the reduction of the current through the electromagnet 2a can be minimal, just sufficient, to allow a determination of a change in the flow profile as time passes. An evaluation circuit, to which the potential between the electrodes is fed, receives, during the time periods I and II, a large signal which is desired for an accurate flow measurement. The reduction of the current through the electromagnet 2a is a function of the degree of the flow profile disturbance. The greater the disturbance, the greater the current reduction in the electromagnet 2a.

What is claimed:

1. Apparatus for measuring the flowrate of a fluid containing electrical charges, said apparatus comprising:
    a pipe section through which said fluid containing electrical charges flows;
    at least one electromagnet for generating a magnetic field extending through said pipe section;
    current supply means for supplying an excitation current to said electromagnet;
    a current sink selectively connectable in parallel with said electromagnet and through which a portion of said excitation current passes when said sink is connected in parallel with said electromagnet;
    means, including at least two electrodes disposed along a line passing through said pipe section in the region of said magnetic field, for generating signals representative of displacements of electrical charges in said fluid;
    a timing circuit for selectively connecting said current sink in parallel with said electromagnet to draw a portion of said excitation current through said sink and thereby change the level of said excitation current supplied to said electromagnet;
    and a correction circuit responsive to said signals representative of displacements of electrical charges in said fluid for developing an output signal representative of the flowrate of said fluid in said pipe section, whereby said output signal is only minimally dependent on the flow profile or the level of the fluid in the pipe section.

2. Apparatus according to claim 1 further including means extending between said correction circuit and said sink for controlling the amount of excitation current passing through said sink.

3. Apparatus according to claim 2 wherein said signal generating means further include:
    (a) first and second signal memories for storing signals from said electrodes and for supplying said signals representative of displacements of electrical charges in said fluid to said correction circuit, and
    (b) a signal switching element connected between said electrodes and said signal memories and responsive to said timing circuit for selectively directing signals from said electrodes to said first signal memory when said sink is not connected in a parallel with said electromagnet and to said second signal memory when said sink is connected in parallel with said electromagnet.

4. Apparatus according to claim 3 wherein said current supply means include a direct current source and a reverse/off switch.

5. Apparatus according to claim 3 wherein said current supply means include an alternating current source.

6. Apparatus for measuring the flowrate of a fluid containing electrical charges, said apparatus comprising:
    a pipe section through which said fluid containing electrical charges flows;
    a pair of electromagnets for generating a magnetic field extending through said pipe section;
    current supply means for supplying an excitation current to said electromagnets;
    a current sink selectively connectable in parallel with one of said electromagnets and through which a portion of said excitation current passes when said sink is connected in parallel with said one electromagnet;

means, including a pair of electrodes disposed along a line passing through said pipe section in the region of said magnetic field, for generating signals representative of displacements of electrical charges in said fluid;

a timing circuit for selectively connecting said current sink in parallel with said one electromagnet to draw a portion of said excitation current through said sink and thereby change the level of said excitation current supplied to said electromagnet;

and a correction circuit responsive to said signals representative of displacements of electrical charges in said fluid for developing an output signal representative of the flowrate of said fluid in said pipe section, whereby said output signal is only minimally dependent on the flow profile or the level of the fluid in the pipe section.

7. Apparatus according to claim 6 further including means extending between said correction circuit and said sink for controlling the amount of excitation current passing through said sink.

8. Apparatus according to claim 7 wherein said signal generating means further include:
(a) first and second signal memories for storing signals from said electrodes and for supplying said signals representative of displacements of electrical charges in said fluid to said correction circuit, and
(b) a signal switching element connected between said electrodes and said signal memories and responsive to said timing circuit for selectively directing signals from said electrodes to said first signal memory when said sink is not connected in parallel with said one electromagnet and to said second signal memory when said sink is connected in parallel with said one electromagnet.

9. Apparatus according to claim 8 wherein said current supply means include a direct current source and a reverse/off switch.

10. Apparatus according to claim 8 wherein said current supply means include an alternating current source.

11. A device to measure the flowrate of a fluid containing electrical charges which flows in a pipe section in which the device includes at least one electromagnet connected to a current source, which generates a magnetic field through the pipe section and contains at least two electrodes to measure the potential resulting from the charge displacements whose central imaginary connecting line passes through the flow stream in the region of the magnetic field, and contains a timing circuit which periodically changes the strength of the excitation current from the current source to the electromagnet and switches a signal switching element which is connected between the electrodes and at least two signal memories which are connected to a correction circuit, which from the signals stored in the memories produces an output signal corresponding to the flowrate of the fluid in the pipe section which is only minimally dependent on the flow profile or the level of the fluid in the pipe section, wherein a timing circuit controlled current sink is connected in parallel with the electromagnet and a portion of the excitation current passes through the timing circuit controlled current sink when the timing circuit controlled current sink is connected in parallel with the electromagnet.

12. A device in accordance with claim 11 wherein the current sink is also controlled by the correction circuit.

13. A device in accordance with claim 12 wherein the current source is a direct current source and there is located between the direct current source and the electromagnet a reverse/off switch controlled by the timing circuit.

14. A device in accordance with claim 12 wherein the current source is an alternating current source.

* * * * *

UNITED STATES PATENT AND TRADEMARK OFFICE
CERTIFICATE OF CORRECTION

PATENT NO. : 5,325,724
DATED : July 5, 1994
INVENTOR(S) : Kiene et al.

It is certified that error appears in the above-identified patent and that said Letters Patent is hereby corrected as shown below:

On the title page, insert: item
[73] Assignee: Fischer & Porter Company
Warminster, PA Signed and Sealed this Fourth Day of July, 1995

BRUCE LEHMAN

Attest:

Attesting Officer

Commissioner of Patents and Trademarks